United States Patent [19]

Marshall

[11] Patent Number: 4,654,392
[45] Date of Patent: Mar. 31, 1987

[54] BHA IN VINYL CHLORIDE POLYMERIZATION

[75] Inventor: Richard A. Marshall, Akron, Ohio

[73] Assignee: The Goodyear Tire & Rubber Company, Akron, Ohio

[21] Appl. No.: 754,559

[22] Filed: Jul. 12, 1985

[51] Int. Cl.$^4$ ............................................... C08F 2/38
[52] U.S. Cl. ........................................................ 526/84
[58] Field of Search ............................................ 526/84

[56] References Cited

U.S. PATENT DOCUMENTS

| | | | |
|---|---|---|---|
| 3,658,778 | 4/1972 | Toyoda et al. | 526/84 |
| 4,189,552 | 2/1980 | Kuwata et al. | 526/84 |
| 4,283,514 | 8/1981 | Weiner et al. | 526/84 |
| 4,324,874 | 4/1982 | Cordes, III et al. | 526/84 |
| 4,361,683 | 11/1982 | Dodd et al. | 526/84 |

Primary Examiner—Joseph L. Schofer
Assistant Examiner—N. Sarofim
Attorney, Agent, or Firm—Marc R. Dion, Sr.

[57] ABSTRACT

There is disclosed, in a microsuspension polymerization process for producing homopolymers and copolymers of vinyl chloride, having a dispersion step and a seed polymerization step, the improvement wherein butylated hydroxyanisole (BHA) is added to the dispersion step and, wherein, when necessary to control temperature, additional BHA is added to the seed polymerization step. There is also disclosed a homopolymer or copolymer of vinyl chloride produced by the improved process.

5 Claims, No Drawings

BHA IN VINYL CHLORIDE POLYMERIZATION

FIELD OF THE INVENTION

This invention relates to an improvement in the microsuspension polymerization process for vinyl chloride. More particularly, it relates to the use of butylated hydroxyanisole to react with the decomposition products of the polymerization initiator while not imparting color to the polymer produced in the seed polymerization, to the polymer produced in the subsequent microsuspension polymerization, or to products made therefrom.

BACKGROUND ART

It has been shown that the microsuspension, or fine suspension, process for producing homopolymers or copolymers of vinyl chloride, results in several operational advantages, in particular, control of particle size and decreased incrustation of reactor surfaces. Polymerization in microsuspension is understood to involve three main steps:

(1) The dispersion step wherein the water and the monomer or monomers required for the seed polymerization step are vigorously agitated in the presence of the amount of an organo-soluble initiator required for both the seed polymerization step and the microsuspension polymerization step in order to form an aqueous dispersion of particles having an average diameter of less than 5 microns;

(2) the seed polymerization step wherein the temperature of the dispersion from the prior step is raised, under autogenous pressure, until polymerization begins, then controlled until the seed polymerization is completed; and (3) the microsuspension polymerization step wherein the seeding product of the seed polymerization step, containing all the initiator for the microsuspension polymerization, is added to the monomer or monomers in an aqueous medium, followed by raising the temperature of the mixture until the polymerization begins, then controlling the temperature until polymerization is complete.

Since all the initiator necessary for the microsuspension polymerization of the monomer is present in the considerably smaller seed polymerization batch, it poses the potentiality for the rapid decomposition of the initiator with possible adverse effects to the seeding product as well as to the equipment in which it is produced. To protect against such a potentiality, inhibitors have been used in the seed polymerization step to chemically react with the decomposition products of the initiator and thus limit the number of free radicals present. Heretofore, the inhibitors used, while effective in controlling initiator decomposition, have suffered the disadvantages of being irritants affecting operating personnel and of imparting objectionable color to the polymerized product and other products made therefrom.

DISCLOSURE OF THE INVENTION

In accordance with the practice of the present invention, there is disclosed, in a microsuspension polymerization process for producing homopolymers and copolymers of vinyl chloride, having a dispersion step and a seed polymerization step, the improvement wherein butylated hydroxyanisole (BHA) is added to the dispersion step and, wherein, when necessary to control temperature, additional BHA is added to the seed polymerization step. There is also disclosed a homopolymer or copolymer of vinyl chloride produced by the improved process.

The BHA is added to the dispersion step at a level of about 10 ppm to 200 ppm, preferably 25 ppm to 75 ppm, by weight of BHA based on the total monomer present. When added to the seed polymerization step, the BHA is added at a level of about 10 ppm to 500 ppm by weight of the BHA based on the total monomer present. The BHA can be in its natural form or preferably can be a water dispersible form, hereinafter BHA-WD.

The BHA or BHA-WD is added with the monomer or monomers, water, an organo-soluble initiator and an emulsifier to be finely dispersed by mechanical means such as a colloid mill, a high speed pump, a vibrating agitator or an ultrasonic device. The order of addition of these ingredients is immaterial. The dispersion obtained is then heated under autogenous pressure and with moderate agitation to a temperature, generally 40° C. to 60° C., at which polymerization occurs. The temperature is generally controlled by cooling means such that the exothermic heat of reaction is taken away by the cooling means. Should the exotherm exceed the cooling capacity of the seed polymerization reactor, additional BHA or BHA-WD can be added to the reactor incrementally to chemically react with the decomposition products of the initiator thus reducing the initiator activity, the rate of polymerization thereby regaining temperature control.

Exemplary of the initiators which are used are: organic peroxides such as a diacyl peroxide, e.g. lauroyl, decanoyl, benzoyl, diacetyl and caproyl peroxide; t-butylperoxy acetate; and di(2-ethylhexyl) peroxydicarbonate.

The other monomers which can be used with vinyl chloride monomer are any one or more monomers known in the art to form copolymers with vinyl chloride using a microsuspension polymerization process.

The seed polymer batches resulting from the polymerization described above are used to provide all the initiator as well as the seed particles to initiate polymerization of a larger quantity of monomer or monomers in the microsuspension polymerization step either in a batch reactor or in a continuous process. The products from the microsuspension polymerization are especially suitable for use in producing plastisols.

Plastisols are dispersions of finely divided resins in a plasticizer. Plastisols can be used in molding operations or can be used to make foam by mixing with blowing agents and heating the mixture to activate the blowing agent. It is in this latter operation that prior known inhibitors have been found to react with the blowing agents to form color bodies thus imparting greyish to yellowish colors to the foamed product. In addition, it is believed that prior known inhibitors, which are irritants to operating personnel who handle them in their raw state, can also be extracted or migrated from those foam products intended to come in contact with skin to cause skin irritation. BHA is generally regarded as non-toxic and is also known to be used as a food preservative.

EXAMPLE I

A microsuspension polymerization recipe as shown in Table I was used with various amounts and types of inhibitors as well as controls containing no inhibitor. Each mixture was dispersed by circulating from a reactor through a sixty mesh screen then through a homogenizer and back to the reactor for a total period of 2.5 hours at 15° C. The quantity of polymer collected on the screen was weighed and is shown in Table II. The lower quantity of polymer was used as an indication of higher inhibition effectiveness after the dispersion step. The temperature in the reactor was raised to 47° C. to initiate the polymerization under autogeneous pressure. The time for the pressure in the reactor to be reduced to 70 psi through polymerization of the monomer was used as the polymerization time. The longer polymerization time was an indication of higher inhibition effectiveness during the reaction step as shown in Table II.

TABLE I

| Material | Parts by Weight |
|---|---|
| Vinyl chloride monomer | 100 |
| Water | 186 |
| Buffer | 0.228 |
| Emulsifier | 1.5 |
| Initiator | 2.0 |
| Inhibitor | See Table II |

TABLE II

| Inhibitor | PPM Based On Monomer | Polymer on Screen, g | Reaction Time, h |
|---|---|---|---|
| Inhibitor X[1] | 100 | 6.6 | 4.17 |
| BHA | 100 | 0 | 7.33 |
| BHA | 150 | 0.8 | 7.75 |
| BHA-WD | 75[2] | 1.1 | 5.92 |
| BHA-WD | 112.5[2] | 1.9 | 6.88 |
| BHA-WD | 150[2] | 0 | 7.7 |
| None (control) | 0 | 1.7 | 4.37 |
| None (control) | 0 | 6.7 | 5.05 |

Notes:
[1]Commercially used inhibitor under license from ATOCHEM. Identity is proprietary as a result of the license.
[2]Active BHA

EXAMPLE 2

A basic plastisol foam was made according to the formulation shown in Table III. To one portion was added 2.5 parts per million by weight of Inhibitor X. To another portion was added 2.5 parts per million by weight, based on the active BHA, of BHA-WD. No inhibitor was added to the third portion to be used as a control. Each of the mixtures was further divided into four portions to be foamed and fused at the four temperatures listed in Table IV. The resulting foams were tested on a Gardner Colorimeter to determine the Rd value which is a measure of the black to white color scale from 0 to 100 respectively. The Rd values at the various temperatures are shown in Table IV.

TABLE III

| Material | Parts by Weight |
|---|---|
| Polyvinyl chloride resin | 100.0 |
| Foaming agent | 5.0 |
| Stabilizers | 22.5 |
| White pigments | 17.0 |
| Plasticizer | 50.0 |

TABLE IV

| Inhibitor | Gardner Colorimeter Rd | | | |
| | 177° C. | 191° C. | 204° C. | 218° C. |
|---|---|---|---|---|
| Inhibitor X | 67.0 | 70.5 | 71.4 | 72.5 |
| BHA-WD | 74.7 | 79.2 | 79.7 | 82.3 |
| None | 76.5 | 79.6 | 81.3 | 82.9 |

While certain representative embodiments and details have been shown for the purpose of illustrating the invention, it will be apparent to those skilled in this art that various changes and modifications may be made therein without departing from the scope of the invention.

What is claimed is:

1. In a microsuspension polymerization process for producing homopolymers and copolymers of vinyl chloride having a dispersion step and a seed polymerization step, the improvement comprising incorporating butylated hydroxyanisole (BHA) in said dispersion step.

2. The process according to claim 1 wherein the BHA is added at a level of from 10 to 200 parts per million by weight based on the weight of the monomer.

3. The process according to claim 2 wherein the BHA is added at a level of from 25 to 75 parts per million by weight based on the weight of the monomer.

4. The process according to claim 1 wherein the BHA is added in the seed polymerization step.

5. The process according to claim 4 wherein the BHA is added at a level of from 10 to 500 parts per million by weight based on the weight of the monomer.

* * * * *